United States Patent [19]

Ino

[11] Patent Number: 4,691,160
[45] Date of Patent: Sep. 1, 1987

[54] APPARATUS COMPRISING A DOUBLE-COLLECTOR ELECTRON MULTIPLIER FOR COUNTING THE NUMBER OF CHARGED PARTICLES

[75] Inventor: Yoichi Ino, Tokyo, Japan

[73] Assignee: Anelva Corporation, Japan

[21] Appl. No.: 669,603

[22] Filed: Nov. 8, 1984

[30] Foreign Application Priority Data

Nov. 11, 1983 [JP] Japan .................................. 58-211069

[51] Int. Cl.⁴ .............................................. G01N 27/00
[52] U.S. Cl. .................................. 324/71.3; 250/283;
  313/103 CM; 324/71.4
[58] Field of Search ...................... 324/71.3, 71.4, 71.1,
  324/464, 465; 313/103 R, 103 CM, 105;
  250/281, 283, 252.1, 299

[56] References Cited

U.S. PATENT DOCUMENTS 2,285,126  6/1942  Rajchman et al. .................. 313/105
2,292,847  8/1942  Rajchman ............................ 313/105
3,622,827  11/1971  Shriner ................................ 313/103
3,644,775  2/1972  Damioth et al. .................... 313/105

*Primary Examiner*—Reinhard J. Eisenzopf
*Assistant Examiner*—Robert W. Mueller
*Attorney, Agent, or Firm*—Laff, Whitesel, Conte & Saret

[57] ABSTRACT

In an apparatus for counting ions, a double-collector electron multiplier comprises a first and a second collector for receiving secondary electrons from an exit end of a dynode member of the electron multiplier. The first and the second collectors have a first and a second electron receiving surface, respectively, wherein the second electron receiving surface has a narrower area than the first electron receiving surface. A first and a second amplifier are separately used in amplifying a first and a second electric current produced from the first and the second collectors, respectively. An ammeter is connected through a switch selectively to the first and the second amplifiers to provide a selected measuring range for the number of ions which enter the electron multiplier.

7 Claims, 2 Drawing Figures

APPARATUS COMPRISING A DOUBLE-COLLECTOR ELECTRON MULTIPLIER FOR COUNTING THE NUMBER OF CHARGED PARTICLES

BACKGROUND OF THE INVENTION

This invention relates to an apparatus comprising an electron multiplier for counting the number of charged particles in, for example, a mass spectrometer.

In the manner known in the art, a mass spectrometer comprises a number counting apparatus of the type described. The number counting apparatus is supplied with ions from an analyzer for use in separating the ions according to masses. The number counting apparatus is for use in counting the ions of individual masses which are supplied thereto as an ion current. Ions of a particular mass may amount to a considerable number while ions of other masses are small in number. The number counting apparatus must therefore have a wide measuring or dynamic range, for example, between 120 dB and 140 dB.

The number counting apparatus usually comprises an open ended electron multiplier for producing an electric current in response to the ion current. An amplifier is for amplifying the electric current to produce an amplified current. An ammeter or a like meter is used as a measuring device in measuring the amplified current to get the number of ions which enter the electron multiplier as the ion current per unit time.

As will later be described more in detail, a conventional electron multiplier comprises a first and a second collector in order to widen the measuring range. More particularly, the electron multiplier comprises a dynode member having an entrance and an exit end in the manner known in the art. The first collector is for collecting secondary electrons from the exit end to produce a first electric current. The second collector is for collecting secondary electrons from a dynode element which is selected between the entrance and the exit ends. The second collector produces a second electric current which is weaker than the first electric current. In other words, a sensitivity ratio of the second electric current to the first electric current is less than unity.

In a conventional number counting apparatus which comprises the double-collector electron multiplier of the above-described type, only one amplifier is used in selectively amplifying the first and the second electric currents. For the selective supply of the electric currents, a switch is interposed between the double-collector electron multiplier and the amplifier to switch the measuring range.

In the conventional number counting apparatus, the above-mentioned sensitivity ratio inevitably fluctuates. It is therefore necessary on switching the measuring range to calibrate the sensitivity ratio. In other words, it is impossible with the conventional number counting apparatus to readily switch the measuring range. Furthermore, the measuring range switching has been rendered more troublesome by the single amplifier. This is because the amplifier unavoidably has a stray capacity. When the measuring range is switched from one to the other, the ions must be counted after the stray capacity is completely discharged.

SUMMARY OF THE INVENTION

It is therefore an object of this invention to provide a number counting apparatus which is capable of readily switching a measuring range.

It is another object of this invention to provide a number counting apparatus of the type described, which is capable of quickly responding to switching of the measuring range.

Other object of this invention will become clear as the description proceeds.

A number counting apparatus to which this invention is applicable comprises an open-ended electron multiplier which comprises a multiplier vessel having an inlet and defining a hollow space in communication with the inlet. The number counting apparatus is for counting the number of charged particles entering the hollow space through the inlet. The electron multiplier comprises a dynode member in the space near the inlet for producing secondary electrons in response to the charged particles and a first collector for collecting the secondary electrons on a first electron receiving surface to produce a first electric current. The number counting apparatus further comprises first amplifying means responsive to the first electric current for producing a first amplified current and measuring means for measuring the first amplified current as the number of the charged particles. According to this invention, the electron multiplier comprises a second collector which has a second electron receiving surface having a narrower area than the first electron receiving surface and which is disposed in the space between the dynode member and the first collector. The second collector is for collecting a portion of the secondary electrons on the second electron receiving surface to produce a second electric current. The number counting apparatus further comprises second amplifying means responsive to said second electric current for producing a second amplified current and selecting means for selectively supplying the second amplified current to the measuring means as an additional representative of the number of the charged particles.

DESCRIPTION OF THE PREFERRED EMBODIMENT

Figure 1:
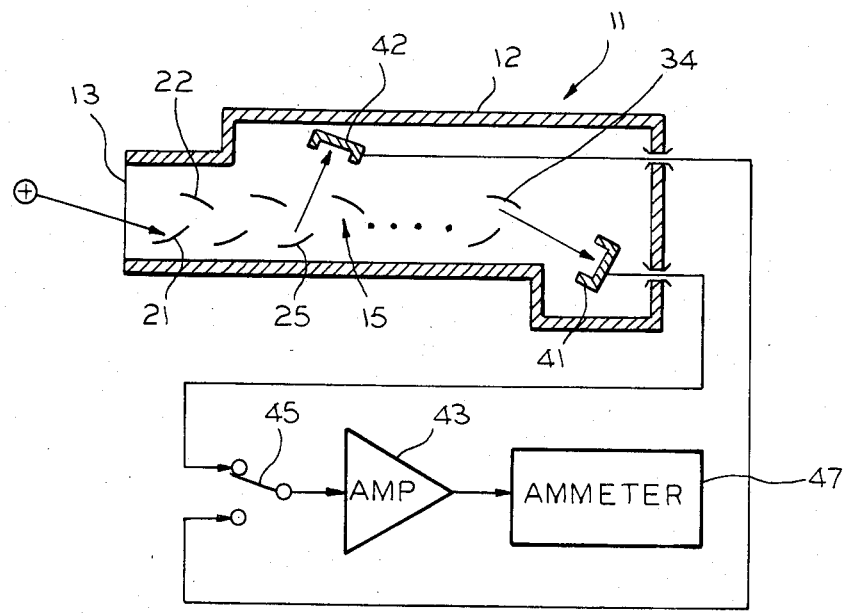
FIG. 1 is a block diagram of a conventional number counting apparatus with an open-ended electron multiplier thereof depicted in a schematic vertical sectional view.

Referring to FIG. 1, a conventional number counting apparatus will be described at first for a better understanding of this invention. The number counting apparatus is substantially equivalent to that described in the preamble of the instant specification. The number counting apparatus comprises an open-ended electron multiplier 11. The electron multiplier 11 comprises a multiplier vessel 12 which has an inlet 13 and which defines a hollow space in communication with the inlet 13. The inlet 13 is coupled to an analyzer (not shown) of a mass spectrometer. The hollow space is kept at a pressure which is not higher than $10^{-5}$ Torr. The number counting apparatus is for counting the number of mass-separated ions which enter the hollow space from an exit of the analyzer through the inlet 13. Therefore, the number counting apparatus operates as that detecting part of the mass spectrometer which responds to the mass-separated ions and which measures an ion current corresponding to the mass-separated ions.

The electron multiplier 11 is of a double-collector type and comprises a dynode member 15 disposed in the hollow space near the inlet 13. The dynode member 15 has an entrance end adjacent to the inlet 13, an exit end farther from the inlet 13, and dynode elements or discrete dynodes 21 through 34 between the entrance and the exit ends. The dynode elements may be equal in number, for example, to fourteen. A first dynode 21 is placed nearest to the inlet 13 and serves as the entrance end of the dynode member 15. A final dynode 34 is placed farthest from the inlet 13 and serves as the exit end of the dynode member 15. A first collector 41 is disposed in the hollow space farther from the inlet 13 than the dynode member 15 and is kept at the earth potential. In the manner known in the art, the dynode member 15 is supplied with a negative voltage relative to the earth potential with the first and the final dynodes 21 and 34 kept at a lowest and a highest potential, respectively, and with the remaining dynodes kept at potentials successively raised towards the final dynode 34.

It is assumed that the ions enter the dynode member 15 through the inlet 13 to be counted by the illustrated apparatus and bombard the first dynode 21. The first dynode 21 emits more than one secondary electron for every incident ion. The secondary electrons emitted from the first dynode 21 are accelerated and directed towards a second dynode 22. The secondary electrons bombard the second dynode 22, which emits more secondary ions. Such a process is repeated in every dynode. The final dynode 34 emits a large number of secondary electrons. Thus, the dynode member 15 produces secondary ions in response to the ions bombarding the first dynode 21. The number of secondary electrons produced by the dynode member 15 is equal to a product of the number of the ions entering the first dynode 21 and a gain of the electron multiplier 15. The first collector 41 is for collecting the secondary electrons emitted from the final dynode 34 to produce a first electric current.

A second collector 42 is disposed in the hollow space so as to collect secondary electrons emitted from an intermediate dynode 25 which is positioned between the first and the final dynodes 21 and 34. The second collector 42 is kept either at the earth potential or in an electrically floating state. The second collector 42 produces a second electric current in response to the secondary electrons received thereby.

Only one amplifier 43 is used in selectively amplifying the first and the second electric currents to produce an amplified current. A switch 45 is interposed between the collectors 41 and 42 and the amplifier 43 and is for selectively supplying the first and the second electric currents to the amplifier 43. It is possible to switch a measuring range by operation of the switch 45. An ammeter 47 is used as a measuring device in measuring the amplified current to get the number of the ions which enter the number counting apparatus.

With this structure, the second electric current is weaker than the first electric current because the second collector 42 receives a less number of secondary electrons than the first collector 41. That is, a sensitivity ratio of the second electric current to the first electric current is less than unity. When the ions to be counted are numerous, the switch 45 is operated so that the second electric current is supplied to the amplifier 43. Thus, the conventional counting apparatus is capable of enlarging the measuring range.

However, the sensitivity ratio inevitably fluctuates according to fluctuation of the gain of the electron multiplier 11. This is because the first and the second collectors 41 and 42 respond to secondary electrons emitted from two different dynodes, such as the final and the intermediate dynode 34 and 25. Calibration is accordingly necessary to determine the present sensitivity ratio whenever a change of the measuring ranges is carried out by operation of the switch 45. Such calibration is very cumbersome. Thus, the conventional apparatus is incapable of readily changing the measuring ranges.

A single amplifier 43 is in common to both of the measuring ranges. With this structure, the single amplifier 43 should cooperate with the first and the second collectors 41 and 42. Accordingly, the switch 45 must be placed between the amplifier 43 and both of the first and the second collectors 41 and 42. The amplifier 43 is inevitably accompanied by a stray capacity. When the measuring range is switched from one to the other, the ions must be counted after the stray capacity is completely discharged. Anyway, it is impossible to quickly respond to change of the measuring ranges. That is to say, the conventional apparatus is incapable of measuring phenomena which change at a high rate.

Figure 2:
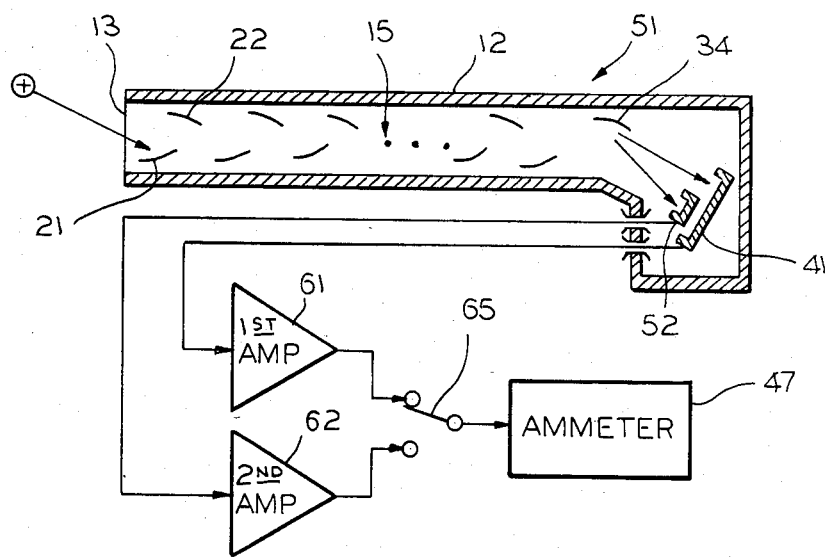
FIG. 2 is a similar diagram of a number counting apparatus according to a preferred embodiment of this invention.

Referring to FIG. 2, a number counting apparatus according to a preferred embodiment of this invention comprises similar parts designated by like reference numerals.

The number counting apparatus comprises an improved double-collector electron multiplier 51. The electron multiplier 51 comprises a second collector 52 disposed in the hollow space between the dynode member 15 and the first collector 41. More particularly, the second collector 52 is disposed between the exit end or the final dynode 34 and the first collector 41. The first and the second collectors 41 and 52 have a first and a second electron receiving surface, respectively. The first and the second electron receiving surfaces are parallel to each other and are for collectively collecting secondary electrons emitted from the final dynode 34. The second electron receiving surface has a narrower area than the first electron surface. Therefore, the second collector 52 produces a second electric current which is weaker than the first electric current produced by the first collector 41. An effective or available area ratio of the second electron receiving surface to the first electron receiving surface is, for example, 1/1000. The sensitivity ratio of the second current to the first current is substantially equal to the effective area ratio.

The number counting apparatus further comprises first and second amplifiers 61 and 62. The first amplifier 61 is operable as a first amplifying circuit for producing a first amplified current in response to the first electric current. The second amplifier 62 is operable as a second amplifying circuit for producing a second amplified current in response to the second electric current. A switch 65 is interposed between a pair of the amplifiers 61 and 62 and the ammeter 47 and is operable as a selecting element for selectively supplying the first and the second amplified currents to the ammeter 47. It is possible to switch the measuring range by operation of the switch 65. When the first amplifier 61 is connected to the ammeter 47 by the switch 65, the ammeter 47 measures the first amplified current as a representative of the number of the ions entering the inlet 13. Otherwise, the ammeter 47 measures the second amplified current as an additional representative of the number of the ions.

With this structure, it is possible to widen the measuring range as is the case with the conventional number counting apparatus illustrated with reference to FIG. 1. This is because when the ions to be counted becomes numerous, the switch 65 is operated so that the second amplified current is supplied to the ammeter 47 instead of the first amplified current which is 1,000 times stronger than the second amplified current in the numerical example being illustrated when the amplifiers 61 and 62 have a common gain.

Furthermore, the sensitivity ratio of the second electric current to the first electric current is accurately proportional to the effective area ratio of the second electron receiving surface to the first electron receiving surface. The sensitivity ratio does not fluctuate but maintains a constant value even if a fluctuation occurs in the gain of the electron multiplier 51. This is because the first and the second collectors 41 and 52 respond to secondary electrons which are emitted by the same dynode 34. Inasmuch as the above-mentioned calibration is rendered thereby unnecessary, it is possible to readily change the measuring ranges.

The first and the second amplifiers 61 and 62 are individually coupled to the first and the second collectors 41 and 52. Moreover, the switch 65 is placed between a pair of the amplifiers 61 and 62 and the ammeter 47. With this structure, consideration is unnecessary on the above-mentioned discharge of the stray capacity on switching the measuring range from one to the other. Accordingly, it is possible to quickly respond to change of the measuring ranges. It is therefore possible to measure phenomena which change at a high rate.

While the present invention has thus far been described in conjunction with a preferred embodiment thereof, it will readily be possible for those skilled in the art to put this invention into practice in various other manners. For example, a continuous dynode-type or channel dynode-type electron multiplier may be used instead of the electron multiplier 51. The continuous dynode-type electron multiplier comprises a continuous dynode instead of the discrete dynodes 21. Such a continuous dynode-type electron multiplier is, for example, an electron multiplier known by a trade name Channeltron and manufactured by Galileo Electro-optics Corporation, Mass. The first and the second collectors 41 and 52 may be placed so that the first and the second electron receiving surfaces are substantially coplanar. In this case, it is necessary that the first and the second collectors be electrically insulated from each other. More specifically, the second electron receiving surface may be an electrically insulated part of the first electron receiving surface. Alternatively, the first and the second electron receiving surfaces may be separately positioned substantially on a single plane. The number counting apparatus according to this invention is available for counting the number of various other charged particles such as electrons.

What is claimed is:

1. A number counting apparatus comprising:
    a multiplier vessel having an inlet for enabling an entrance of particles, said vessel defining a hollow space in communication with said inlet;
    a dynode member having an entrance end adjacent said inlet in said space and an exit end remote from said inlet in said space, said dynode member producing secondary electrons through said exit end in response to a receipt of said charged particles through said inlet and to said entrance end;
    a first collector having a first electron receiving surface which is adjacent said exit end of the dynode member in said space, said collector having a first area, said first collector collecting the secondary electrons on said first electron receiving surface to produce a first electric current determined by said first area;
    a second collector having a second electron receiving surface which is close to said first electron receiving surface in said space, said second collector having a second area which is smaller than said first area, said second collector collecting a portion of the secondary electrons on said second electron receiving surface to produce a second electric current which is determined by said second area;
    first amplifying means responsive to said first electric current for producing a first amplified current;
    second amplifying means responsive to said second electric current for producing a second amplified signal;
    selecting means coupled to said first and said second amplifying means for selecting either one of said first and said second amplified signals as a selected signal; and
    indicating means responsive to said selected signal for indicating the number of said charged particles.

2. The number counting apparatus of claim 1, wherein each of said first and said second electron receiving surfaces is directed to said exit end of the dynode member, said first and second electron receiving surfaces being parallel to each other.

3. The number counting apparatus of claim 1, wherein an area ratio of said second area to said first area is smaller than unity.

4. The number counting apparatus of claim 3, wherein said area ratio of the second area to the first area is equal to 1:1000.

5. The number counting apparatus of claim 3, wherein said area ratio of the second area to the first area determines a current ratio of said first electric current to said second electric current.

6. An electron multiplier comprising:
    a multiplier vessel defining a hollow space associated with an inlet through which charged particles are introduced into said hollow space;
    a dynode member disposed in said hollow space and having an entrance end adjacent to said inlet and exit end remote from said inlet, said dynode member responding to said charged particles supplied through said entrance end to produce, through said exit end, secondary electrons in response to said charged particles; and
    a first and a second collector positioned closed to each other and adjacent to said exit end in said space and having a first and a second electron receiving surface, respectively, said first and said second electron receiving surfaces having a first area and a second area in which said second area is smaller than said first area to collect said secondary electrons at a ratio determined by an area ratio between said first and said second areas, said second electron receiving surface having a narrower area than said first electron receiving surface has.

7. An electron multiplier as claimed in claim 6, wherein said second collector is disposed between said dynode member and said first collector.

* * * * *